May 14, 1940.  J. M. RODRIGUEZ  2,200,935
SCOOTER BRAKE
Filed April 25, 1939

WITNESSES

INVENTOR
Joseph M. Rodriguez
BY
ATTORNEYS

UNITED STATES PATENT OFFICE 2,200,935

SCOOTER BRAKE

Joseph M. Rodriguez, Brooklyn, N. Y.

Application April 25, 1939, Serial No. 269,832

4 Claims. (Cl. 188—20)

This invention relates to wheeled vehicles, such as scooters or coasters popular with children as a toy vehicle, and of the four wheel type, with a foot brake and a handle-bar whereby the child will not have any difficulty in keeping equilibrium while riding same.

The general object of my invention is to manufacture a four wheeled scooter having a wheel support with two wheels adjacent the front and two wheels adjacent the back together with a foot brake which will enable the child to slow down the running speed of the scooter or stop it at will.

A further object of my invention is to use the present day, parts of skates, such as the front and back wheel support of same with either rubber or spring type cushion, commonly used on skates for steering same. These wheel supports of skates are mounted or riveted to a suitable rectangular steel plate drilled with holes to fasten same to foot board as shown in Figs. 1 and 2. Both front and back wheel supports of the skates with wheels independently mounted on said plates are bolted to and under the front and back of the foot board which can also be a stamped metal foot plate.

A further object of the invention is to provide a foot actuated brake that they may be easily actuated by a child and when functioning cause a reduction of speed of the scooter or complete stoppage thereof.

It is understood, that changes, variations and modifications may be made in the invention, as come properly within the scope of the appended claims, without departing from the spirit of the invention or sacrificing any of its advantage.

In the accompanying drawing.

Similar reference characters indicate the corresponding parts throughout the several views in the drawing.

Figure 1:
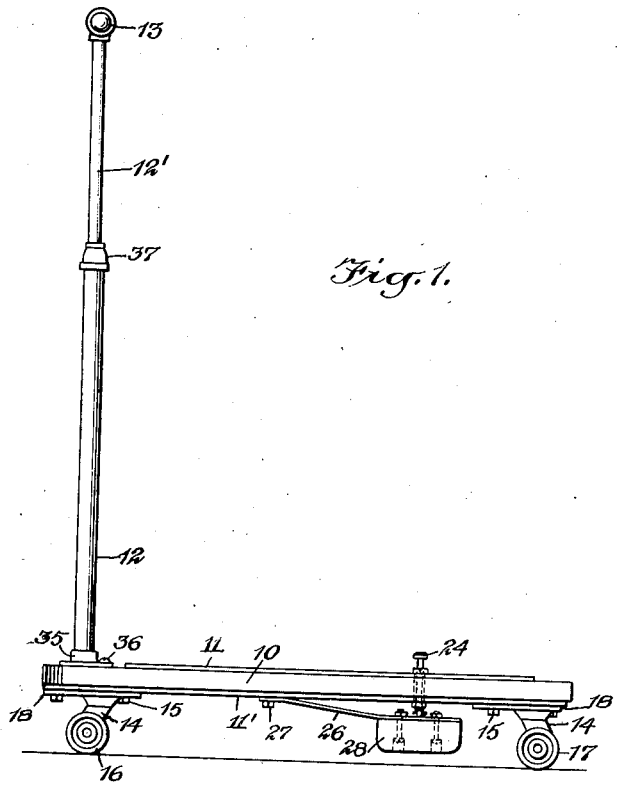
Fig. 1 is a side elevation of the scooter constructed in accordance with the invention.
Figure 2:
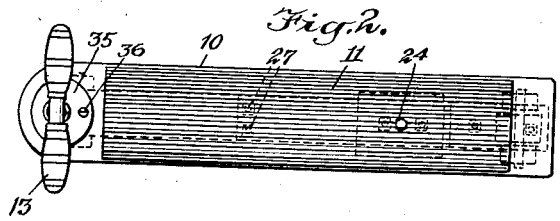
Fig. 2 is a plan view of the scooter illustrated in Fig. 1.

Referring to the accompanying drawing by numerals, 10 indicates a base or foot board which may be constructed of wood or suitable stamped metal. Preferably, a corrugated rubber pad 11 is mounted on the upper surface of the board 10 and is held to the board in any suitable way, preferably by adhesive. This is desirable in order to prevent the foot of the child using the scooter from slipping when pushing the scooter along. Also, preferably, a stringer 11' of wood or other desired material is fastened to the bottom of the board 10 which raises the foot board 10 with the respective rollers 16 and 17. These rollers are mounted on suitable members 14 which are connected in any desired manner to plates 18 and 19, which plates may be secured in any desired manner to the board 10, as for instance, by the bolts or screws 15. A base plate 35 is secured to the board 10 by screws 36 or other suitable means. This base plate is provided with a socket into which the post 12 is tightly fitted. If desired, these parts may be threaded and screwed together, although other fastening means may be used without departing from the spirit of the invention. A reduced extension 12' is provided at the upper end of the post 12 and secured to the post 12 by a reducing connection 37. A pair of handles 13 are secured in any desired manner to the upper end of extension 12' so that a child may readily grasp the same. The parts just described are presented to disclose a construction capable of functioning with the brake and parts shown particularly in Fig. 3 of the drawing.

Figure 3:
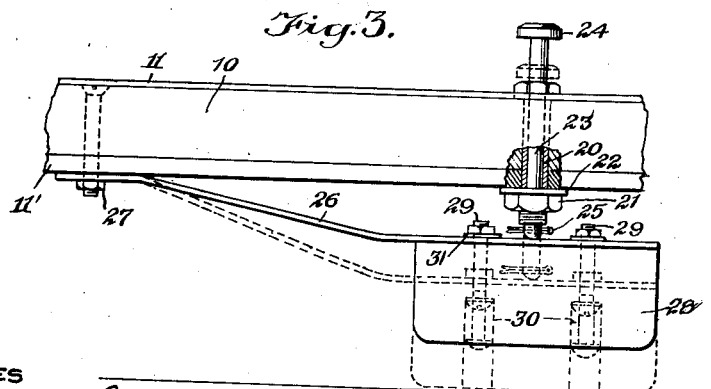
Fig. 3 is an enlarged fragmentary detail side view of the foot board and foot brake for stopping the scooter.

Fig. 3 is an enlarged fragmentary detail view of a portion of the foot board, showing the exact construction of the foot brake, 20 on the drawing designates a threaded bushing with outside hexagon head inserted in a hole drilled thru the foot board and fastened to same, by nut 21 and lock washer 22.

Thru bushing 20, there is a sliding pin 23 with a round head 24 for pressing with foot when applying the brake. The sliding pin 23 is held in bushing 20 by means of a cotter pin 25. The sliding pin 23 is always held in the upward position by means of the upward pressure of the strap type spring 26, which is conveniently bent to give the pressure required. This strap spring is fastened to the bottom of the foot board by means of two bolts 27. This strap type spring supports the wooden brake shoe 28, and is fastened to strap spring by means of two bolts 29 inserted thru two counter bored holes 30 in the wooden brake shoe. The two bolts are prevented from becoming loose by means of two spring washers 31.

The pin 23 as shown in Fig. 3 is in the top position ready to be pressed with foot for applying the brake, whereby compressing the strap spring 34 and also pressing the brake shoe downward to surface of street or pavement. The speed of stopping the scooter depends on the pressure applied to the pin 23.

What is claimed is:

1. In a scooter, a foot board having a bore extending therethrough near one end, a tubular member extending through said bore, means at each end of said tubular member for clamping the same in position, a rod slidingly fitted into said tubular member and extending therebeyond at each end, a flat spring secured at one end to said foot board at a point spaced from said bore, said flat spring extending beneath said rod, a friction member and means for clamping said friction member to said flat spring at a point substantially in line with said rod, whereby when said rod is forced downwardly it will swing one end of said flat spring downwardly and cause said friction member to function, said spring acting to raise said rod and friction member when the rod is released.

2. In a scooter provided with a foot board having a bore extending therethrough, a rod slidingly mounted in said bore, means at the top and bottom of the rod for preventing the rod from leaving said bore, a flat spring of less width than said board, a pair of spaced securing means at one end of said spring for securing the same to the under surface of said board whereby the spring can swing upwardly and downwardly but not laterally, said spring having the free end extending beneath said rod, a friction member mounted on the under surface of said spring at said free end, and a plurality of spaced bolts for securing said friction member to said spring, said bolts having their lower ends spaced upwardly from the bottom of the friction member whereby when said rod is depressed said spring will be swung downwardly and said friction member will be brought against the ground without causing the ends of the bolts to contact with the ground.

3. In a scooter, a foot board having a bore extending therethrough near one end, a metallic tubular bushing extending through said bore, means at each end of said bushing for preventing any independent longitudinal movement of the bushing, a rod slidingly fitted into said bushing and extending therebeyond at each end, and means carried by said rod at each end for preventing the rod from leaving the bushing, a flat spring secured at one end to said foot board at a point spaced from said bore, the free end of said flat spring extending beneath said rod, a friction member, and means for securing said friction member to said flat spring at a point substantially in line with said rod, whereby when said rod is forced downwardly it will swing one end of said spring downwardly and cause said friction member to engage the ground substantially flatwise, said spring acting to raise said rod and friction member when the rod is released.

4. In a scooter, a foot board having a bore extending therethrough near one end, a rod slidingly mounted in said bore, said rod at the upper end being provided with an enlarged head acting to prevent the rod from passing through said bore and also acting as a brake pedal, means at the lower end of said rod for preventing the rod from passing upwardly through said bore, a flat spring secured at one end to said foot board and positioned so that the other end will be beneath said rod, and a friction member secured to said spring beneath said rod, said friction member being formed so that its lower surface will engage the earth flatwise when the friction member is depressed, said spring acting to raise said friction member and the rod when the rod is released.

JOSEPH M. RODRIGUEZ.